(12) United States Patent
Boerhout

(10) Patent No.: US 10,444,120 B2
(45) Date of Patent: Oct. 15, 2019

(54) SYNTHESIS OF HUMAN AND MACHINE DIAGNOSIS

(71) Applicant: Johannes Izak Boerhout, San Diego, CA (US)

(72) Inventor: Johannes Izak Boerhout, San Diego, CA (US)

(73) Assignee: Aktiebolaget SKF, Göteborg (SE)

( * ) Notice: Subject to any disclaimer, the term of this patent is extended or adjusted under 35 U.S.C. 154(b) by 957 days.

(21) Appl. No.: 14/722,033

(22) Filed: May 26, 2015

(65) Prior Publication Data

US 2016/0349150 A1 Dec. 1, 2016

(51) Int. Cl.
*G01M 99/00* (2011.01)

(52) U.S. Cl.
CPC .................. *G01M 99/005* (2013.01)

(58) Field of Classification Search
CPC .................................................. G01M 99/005
See application file for complete search history.

(56) References Cited

U.S. PATENT DOCUMENTS

| 6,792,360 B2 * | 9/2004 | Smulders | G01H 1/003 |
| | | | 702/35 |
| 2014/0174185 A1 * | 6/2014 | Kreischer | G01H 1/006 |
| | | | 73/579 |

* cited by examiner

*Primary Examiner* — Robert K Carpenter
(74) *Attorney, Agent, or Firm* — Bryan Peckjian; SKF USA Inc. Patent Dept.

(57) ABSTRACT

A method for determining whether a defect exists in a machine. The method includes receiving a signal from a sensor that includes data related to operation of a machine. It is determined whether the data in the signal is accurate or valid and a first input is generated therefrom. It is determined whether a defect exists in the machine by analyzing the data in the signal and a second input is generated therefrom. The first input and the second input are introduced into one or more logic gates, which generate an output that indicates whether the defect exists in the machine. A user is notified when the output indicates that the defect exists in the machine.

18 Claims, 4 Drawing Sheets

SYNTHESIS OF HUMAN AND MACHINE DIAGNOSIS

BACKGROUND

"Machine condition monitoring" refers to the accumulation of a wide variety of process parameters and condition parameters related to the machine. Process parameters may include machine speed (e.g., RPM), load, product speed (e.g., items produced, fluid per unit time, etc.), quality, and the like. Condition parameters may include temperature (e.g., at different locations in the machine), exhaust gases (e.g., SOxNOx), oil and grease conditions, particles in the oil and grease, thermography, vibration, ultra sonic sounds, and the like. Together, these process and condition parameters may form a picture of the machine's ability to perform (e.g., efficiency) and the ability to continue to perform (e.g., likelihood of failure).

Determining whether current machine conditions are harmful or whether an ongoing defect exists based upon analysis of the process parameters and/or condition parameters is the domain of a user referred to as a condition monitoring technician. In addition to the condition monitoring technician, many condition monitoring providers also include some form of automatic diagnostic capability in their systems.

One type of automatic diagnostic engine is a model-based engine where measurements, extracted measurement features, and/or how they relate to one another are analyzed to detect specific machine failure conditions. Model-based automatic diagnostic engines tend to fail if the model encounters a set of parameter conditions that is not part of the model's logic. Another form of automatic diagnostic engine is a statistics-based engine where a set of statistical algorithms are analyzed to determine deviation from the norm and/or show outliers. Statistical-based automatic diagnostic engines may not be able to identify what the particular problem is.

SUMMARY

A method for determining whether a defect exists in a machine is disclosed. The method includes receiving a signal from a sensor that includes data related to operation of a machine. It is determined whether the data in the signal is accurate or valid and a first input is generated therefrom. It is determined whether a defect exists in the machine by analyzing the data in the signal and a second input is generated therefrom. The first input and the second input are introduced into one or more logic gates, which generate an output that indicates whether the defect exists in the machine. A user is notified when the output indicates that the defect exists in the machine.

A non-transitory computer-readable medium is disclosed. The medium stores instructions that, when executed by at least one processor of a computing system, cause the computing system to perform operations. The operations include receiving a signal from a sensor that includes data related to operation of a machine. It is determined whether the data in the signal is accurate or valid and a first input is generated therefrom. It is determined whether a defect exists in the machine by analyzing the data in the signal and a second input is generated therefrom. The first input and the second input are introduced into one or more logic gates, which generate an output that indicates whether the defect exists in the machine. A user is notified when the output indicates that the defect exists in the machine.

A computing system is also disclosed. The computing system includes one or more processors and a memory system including one or more non-transitory computer-readable media storing instructions that, when executed by at least one of the one or more processors, cause the computing system to perform operations. The operations include receiving a signal from a sensor that includes data related to operation of a machine. It is determined whether the data in the signal is accurate or valid and a first input is generated therefrom. It is determined whether a defect exists in the machine by analyzing the data in the signal and a second input is generated therefrom. The first input and the second input are introduced into one or more logic gates, which generate an output that indicates whether the defect exists in the machine. A user is notified when the output indicates that the defect exists in the machine.

BRIEF DESCRIPTION OF THE DRAWINGS

The accompanying drawings, which are incorporated in and constitutes a part of this specification, illustrates an embodiment of the present teachings and together with the description, serves to explain the principles of the present teachings. In the figures.

Figure 1:
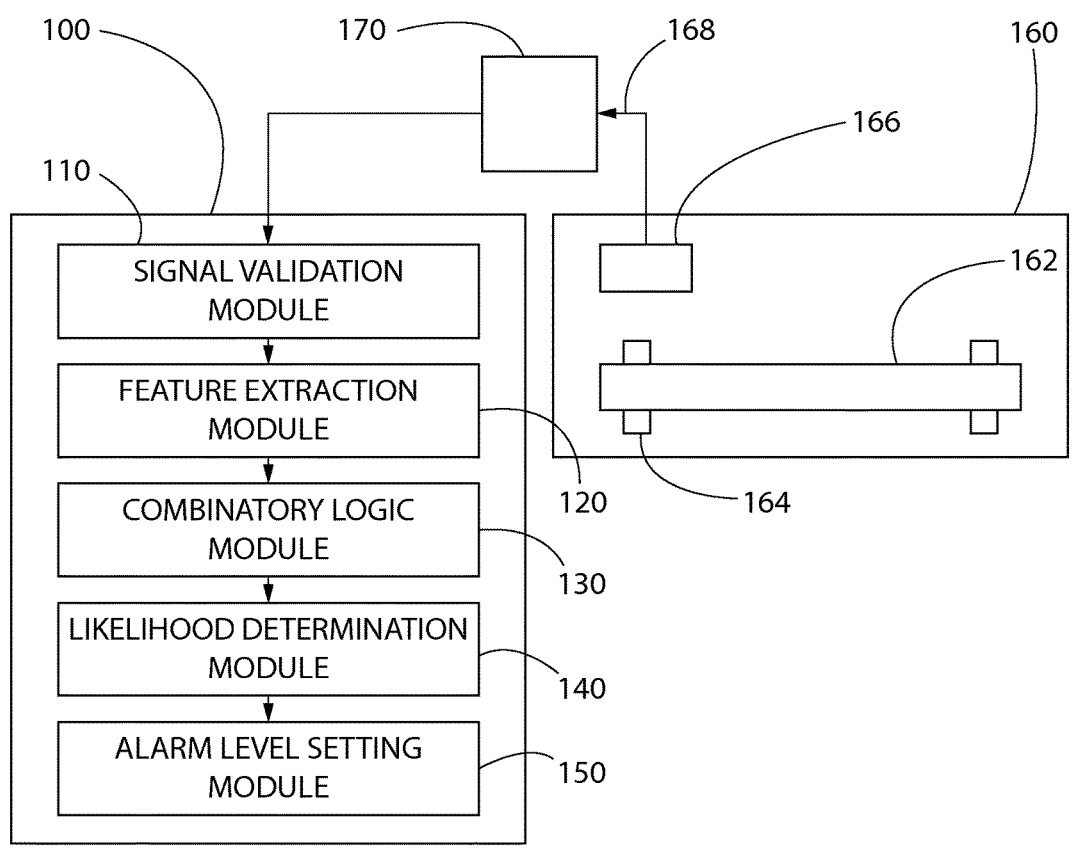
FIG. 1 illustrates a schematic view of an automatic diagnostic engine in communication with a machine, according to an embodiment.

It should be noted that some details of the figures have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements, where convenient. In the following description, reference is made to the accompanying drawings that form a part of the description, and in which is shown by way of illustration one or more specific example embodiments in which the present teachings may be practiced.

Further, notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

The system and method disclosed herein may analyze data (e.g., process parameters, condition parameters, etc.) and determine that a machine is failing or about to fail when the data matches the signature of a failure or an impending failure. In addition, the system and method disclosed herein may analyze the data and determine the likelihood that the machine is failing or about to fail when the data matches the signature of a failure or an impending failure. The system and method disclosed herein may also analyze the data to identify when at least a portion of the data deviates from the norm but does not match the signature of a failure or an impending failure. In other words, the system and method disclosed herein may detect anomalies in the data that do not match the specific failure patterns. When one or more of these events occur, this may trigger a notification or alert that may cause a user (e.g., a condition monitoring technician) to review the data.

Turning now to the figures, FIG. 1 illustrates a schematic view of an automatic diagnostic engine 100 in communication with a machine 160, according to an embodiment. The machine 160 may be or include any tool or device that includes one or more parts that move to perform an intended action. For example, the machine 160 may be or include a turbomachine (e.g., a turbine or a compressor), a pump, a motor, a valve, a gearbox, a coupling, or the like. As shown, the machine 160 includes a rotating shaft 162 that is supported by one or more bearings 164. Although not shown, the machine 160 may also include one or more seals, couplings, gears, vanes, rotors, rotor bars, etc.

One or more sensors (one is shown: 166) may be coupled to and/or in communication with the machine 160. The sensor 166 may be adapted to measure one or more parameters related to the operation of the machine 160. More particularly, the sensor 166 may be adapted to measure one or more process parameters and/or one or more condition parameters related to the machine 160. Illustrative process parameters include machine speed (e.g., RPM), load, product speed (e.g., items produced, fluid per unit time, etc.), quality, and the like. Illustrative condition parameters include temperature (e.g., at different locations in the machine 160), exhaust gases (e.g., SOxNOx), oil and grease conditions, particles in the oil and grease, thermography, vibration, ultra sonic sounds, and the like. In the example shown in FIG. 1, the sensor 166 is adapted to measure the vibration of the bearings 164 in the machine 160. In other embodiments, the sensor 166 may measure parameters related to the seals, couplings, gears, vanes, rotors, rotor bars, etc. The sensor 166 may transmit one or more signal(s) that include the measured parameters (e.g., bearing vibration data) to the automatic diagnostic engine 100. As shown, the signals may travel through a cable 168 and a junction box 170 prior to reaching the automatic diagnostic engine 100.

The automatic diagnostic engine 100 may include a signal validation module 110 that may receive the signals from the sensor 166. The signal validation module 110 may determine whether the data in the signal(s) is valid or accurate, or whether the data in the signal(s) is not valid or accurate. More particularly, the signal validation module 110 may determine whether the sensor 166, the cable 168, and/or the junction box 170 is causing the signals to include erroneous data. The signal validation module 110 may make this determination by analyzing the sensor bias voltage ("BOV") or the normal DC voltage level (e.g., gap). In constant-current signals, the 0-4 mA range may be used to send a "sensor failure" signal. In addition, a signal that includes multiple spikes in the DC voltage level may be detected by a trained neural network or a fast Fourier transform ("FFT"), which may detect ongoing cable breakage.

The automatic diagnostic engine 100 may also include a feature extraction module 120 that may analyze (e.g., quantify) one or more aspects or areas of the signals from the sensor 166. The feature extraction module 120 may analyze the aspects or areas of the signals where defects are known to occur for that particular machine 160. In other embodiments, the feature extraction module 120 may analyze the aspects or areas of the signals where defects are not known to occur for that particular machine 160.

As used herein, "aspects" or "areas" of a signal refer to particular frequencies, frequency bands, frequency bands that harmonically relate to one another (i.e., a harmonic series), demodulated frequencies, demodulated frequency bands, time-waveform spikes, time-waveform slopes, and/or repetitive shapes, slopes, or spikes in the time-waveform. As used herein, a "defect" refers to data in the signal that indicates that a portion of the machine 160 (e.g., the bearing 164) is failing or likely to fail in the near future. The aspects or areas of the signals where defects are "known to occur" may vary from machine to machine; however, these aspects or areas may be known or definable. For example, these aspects or areas may be preloaded into a library in the automatic diagnostic engine 100 so they may be compared against the data in the incoming signals. In some embodiments, in addition to preloading the aspects or areas into the library, the corresponding defect may also be preloaded into the library.

The feature extraction module 120 may analyze the signals using one or more feature extraction operators (i.e., methods). One feature extraction operator is a harmonic activity locator ("HAL") operator. The HAL operator may be used to determine or identify impact-related defects that create a harmonic series. Illustrative impact-related defects that may create a harmonic series may include gear defects and bearing defects. The HAL operator may analyze the frequencies of these gear defects and bearing defects. In one example, a high peak value of the frequency where defects are not known to occur for that particular machine 160 may indicate that a high impact/harmonic series is related to a defect. In some embodiments, the defect may not be identified because the particular signature of the defect may not be stored in the library of the automatic diagnostic engine 100.

Another feature extraction operator is a cyclic time averaging ("CTA") operator. The CTA operator may determine or identify an average time domain signal related to a particular cycle of operation in the machine 160, whether synchronous or not. A high root mean square ("RMS") value and/or a high peak-to-peak value identified by the CTA operator in aspects or areas of the signal where defects are not known to occur for that particular machine 160 may indicate the presence of a high sinusoidal and/or high energy harmonic series that is related to a defect. In some embodiments, the defect may not be identified because the particular signature of the defect may not be stored in the library of the automatic diagnostic engine 100.

Another feature extraction operator is a band filter ("BF") operator. The BF operator may be set to extract energy at specific frequencies where defects are known to occur. In one example, a high RMS value and/or a high peak-to-peak value identified by the BF operator on aspects or areas of the signal where defects are not known to occur for that particular machine 160 may indicate energy that is related to a defect. In some embodiments, the defect may not be identified because the particular signature of the defect may not be stored in the library of the automatic diagnostic engine 100.

Another feature extraction operator is a rate of change ("ROC") operator. The ROC operator may determine how quickly a signal or operator changes. In other words, the ROC operator may bring attention to any parameter with a level that is within acceptable limits but with a percentage change that is significant. The ROC operator may operate on any individual parameter to highlight such a change. The ROC operator may operate on the RMS value of a signal directly or a specific extracted feature. In one example, the ROC operator may operate on the crest factor ("CF") of a signal and/or the extracted noise floor (e.g., carpet) of a signal. In another example, if the peak value analyzed by the HAL operator above yields a low value, suggesting a low priority or low likelihood for that particular un-defect, the ROC operator of that value may indicate that the value has recently changed by 50%, possibly indicating the start of an un-defect, which may need to be brought to the attention of the user.

The operators above may be determined as relative values ranging from about 0% to about 100%. This may indicate that the signal exists entirely from energy computed by the operator.

The automatic diagnostic engine 100 may also include a combinatory logic module 130. The combinatory logic module 130 may receive inputs from the signal validation module 110 and/or the feature extraction module 120. These inputs may be run through one or more sequences of logic functions/gates that are stored in the combinatory logic module 130. The logic functions/gates may include Boolean Logic functions/gates (e.g., INV, AND, OR, NOR, XOR, etc.). The functions/gates may generate an output that indicates whether an anomaly exists in the data indicating that a defect may exist in the machine 160. The output of the combinatory logic module 130 may be a multi-dimensional vector. In one embodiment, the combinatory logic module 130 may also incorporate human observations, such as "spotted oil spill" or ongoing work orders and requests.

Figure 2:
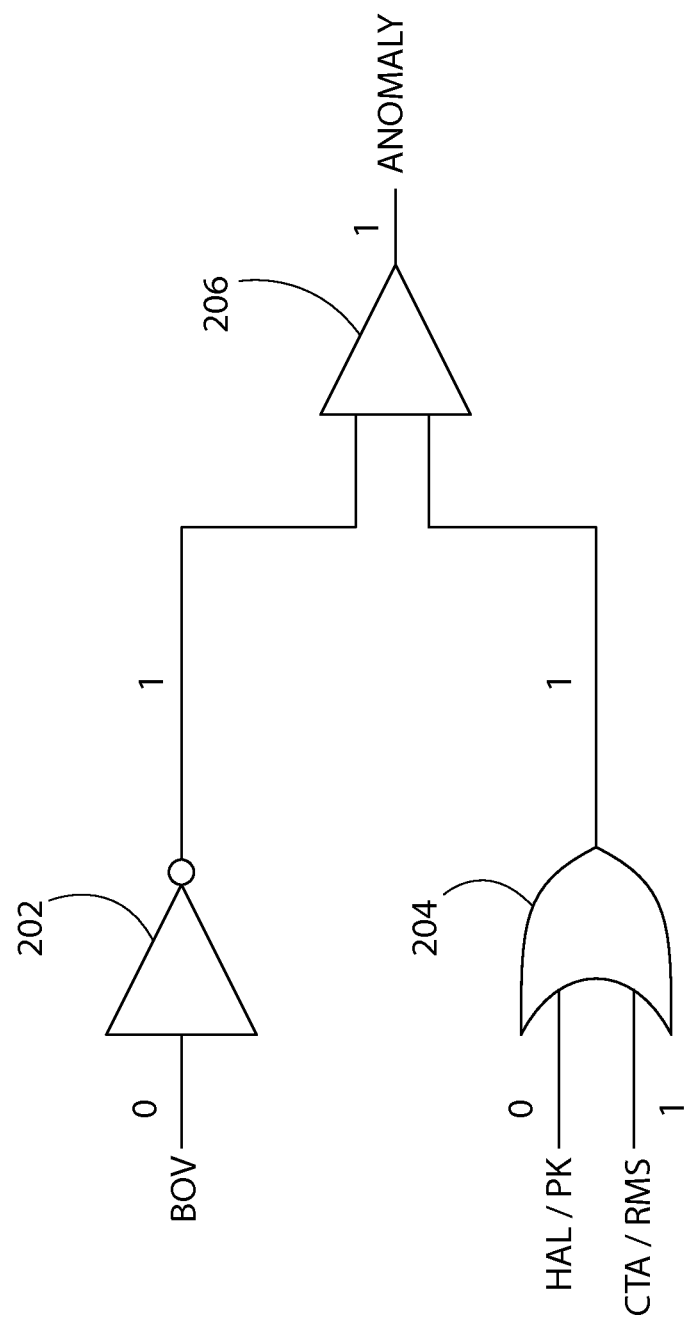
FIG. 2 illustrates a sequence of logic gates in a combinatory logic module of the automatic diagnostic engine, according to an embodiment.

FIG. 2 illustrates one exemplary sequence of logic gates 202, 204, 206 in the combinatory logic module 130, according to an embodiment. The input into the first gate (e.g., a NOT gate) 202 may be the bias output voltage ("BOV") from the sensor 166. When the BOV value is less than a predetermined threshold, the signal validation module 110 may determine that the data in the signal from the sensor 166 is valid or accurate, and an input of 0 may be introduced to the first gate 202. In contrast, when the BOV value is greater than the predetermined threshold, the signal validation module 110 may determine that the data in the signal from the sensor 166 is not valid or accurate, and an input of 1 may be introduced to the first gate 202. In this example, an input of 0 is introduced into the first gate 202, which yields an output of 1.

The first input into the second gate (e.g., an OR gate) 204 may be the peak value of the frequency of the signal from the sensor 166 in aspects or areas of the signal where defects are not known to occur for that particular machine 160, as determined by the HAL operator. When the peak value of the frequency of the signal is less than a predetermined threshold, the feature extraction module 120 may determine that there is no anomaly in the data in the signal, and an input of 0 may be introduced to the second gate 204. In contrast, when the peak value of the frequency of the signal is greater than the predetermined threshold, the feature extraction module 120 may determine that there is an anomaly in the data in the signal, and an input of 1 may be introduced to the second gate 204. In this example, an input of 0 is introduced into the second gate 204.

The second input into the second gate 204 may be the RMS value of the signal from the sensor 166 in aspects or areas of the signal where defects are not known to occur for that particular machine 160, as determined by the CTA operator. When the RMS value of the signal is less than a predetermined threshold, the feature extraction module 120 may determine that there is no anomaly in the data in the signal, and an input of 0 may be introduced to the second gate 204. In contrast, when the RMS value of the signal is greater than the predetermined threshold, the feature extraction module 120 may determine that there is an anomaly in the data in the signal, and an input of 1 may be introduced to the second gate 204. In this example, an input of 1 is introduced into the second gate 204. When at least one of the first and second inputs into the second gate 204 is a 1, the second gate 204 outputs a 1, as shown.

The outputs from the first and second gates 202, 204 may be the inputs into the third gate (e.g., an AND gate) 206. When both of the inputs into the third gate 206 are a 1, as shown, the third gate 206 outputs a 1, indicating that the data in the signal appears to contain an anomaly. When either or both of the inputs into the third gate 206 are a 0, the third gate 206 outputs a 0, indicating that the data in the signal does not appear to contain an anomaly.

Referring again to FIG. 1, the automatic diagnostic engine 100 may also include a likelihood determination module 140. The likelihood determination module 140 may be adapted to determine the likelihood (e.g., confidence) that the output of the combinatory logic module 140 (e.g., output=anomaly) is correct. In other words, likelihood determination module 140 may help determine whether the anomaly in the data is merely an anomaly or the beginning of a trend. The likelihood determination module 140 may acquire multiple data sets from the signals over time to recompute the anomaly output to determine whether the anomaly is the beginning of a trend. The likelihood determination module 140 may be adapted to determine how many measurements to take. The likelihood/confidence level may be computed as the number of times the anomaly is true over the measured time span. This may be presented as a percentage. The speed of the machine 160 and/or the load of the machine 160 may be used to further increase the confidence level. For example, when the speed of the machine 160 is higher than normal, the likelihood determination module 140 may yield anomaly=true with more confidence.

The automatic diagnostic engine 100 may also include an alarm level setting module 150. The alarm level setting module 150 may determine when to notify or alert a user (e.g., a condition monitoring technician) that a failure is occurring or likely to occur in the near future. For example, the alarm level setting module 150 may notify or alert the user when the output of the combinatory logic module 130 indicates that the data in the signal contains an anomaly, and the likelihood determination module 140 indicates a confidence level of greater than or equal to 50%.

Figure 3:
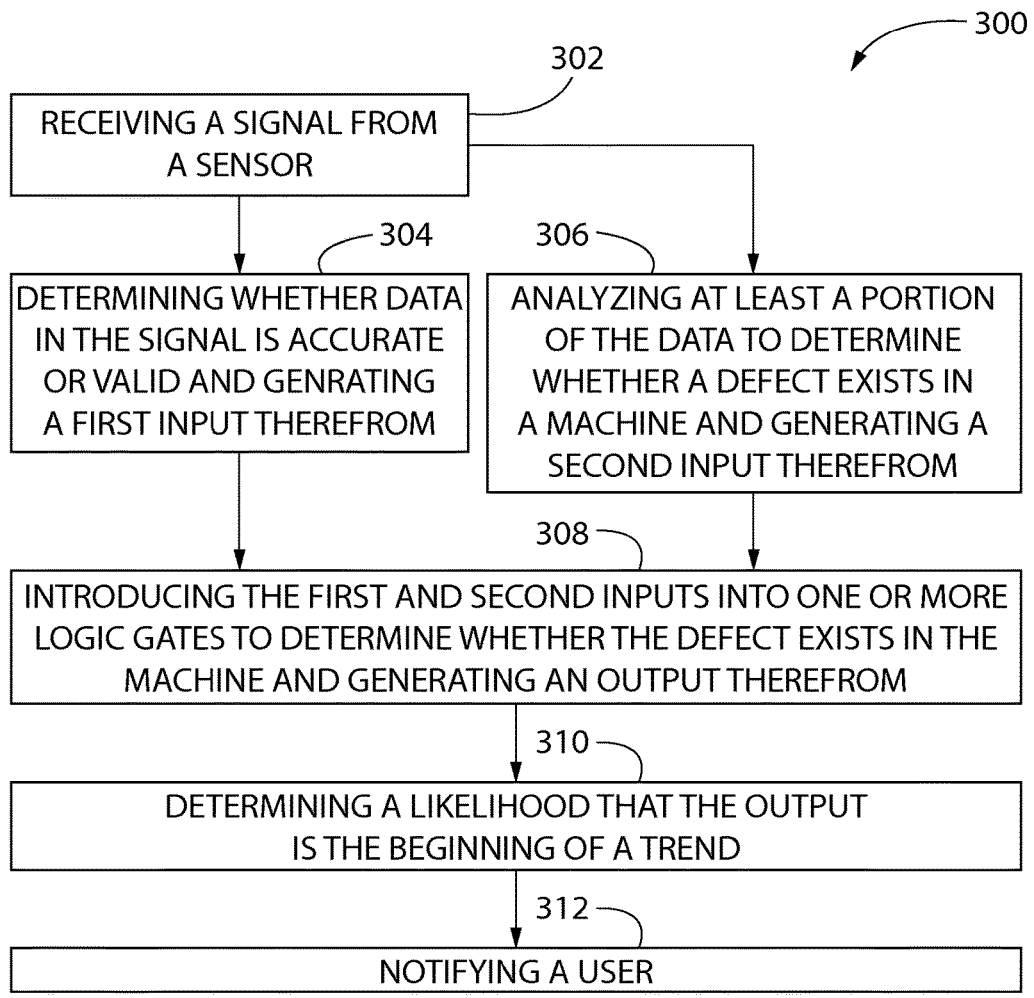
FIG. 3 illustrates a flow chart of a method for determining whether a defect exists in a machine, according to an embodiment.

FIG. 3 illustrates a flow chart of a method 300 for identifying a defect in a machine 160, according to an embodiment. The method 300 may include receiving a signal from a sensor 166, as at 302. The sensor 166 may be coupled to or positioned proximate to a machine 160, and the signal may include one or more parameters related to the operation of the machine 160. For example, the parameters may be or include process parameters or condition parameters.

The method 300 may then include determining whether data in the signal is accurate or valid, as at 304. This may include determining whether one or more errors have been introduced to the data by the sensor 166, the cable 168, the junction box 170, or the like. This determination may be referred to as a first input.

The method 300 may also include analyzing (e.g., quantifying) at least a portion (e.g., an aspect or area) of the signal to identify or determine whether a defect exists in the machine 160, as at 306. This may include analyzing the portion(s) of the signal where defects are known to occur and/or the portion(s) of the signal where defects are not known to occur for that particular machine 160. The analysis may be performed using one or more of the operators discussed above (e.g., HAL, CTA, BF, ROC, etc.). This determination may be referred to as a second input.

The method 300 may also include introducing one or more of the first inputs (from step 304) and/or one or more of the second inputs (from step 306) into one or more logic gates (e.g., 202, 204, 206) to identify or determine whether a defect exists in the machine 160, as at 308. If step 308 indicates that a defect exists in the machine 160, the method 300 may then include determining a likelihood (e.g., a percentage) that the determination from step 308 is an anomaly or the beginning of a trend, as at 310. This may include acquiring multiple data sets from the signals from the sensor 166 over time to perform step 308 one or more subsequent times. The method 300 may then include notifying or alerting a user when the defect is determined to exist in the machine 160 and the likelihood that the defect exists is greater than or equal to a predetermined threshold (e.g., 50%).

Figure 4:
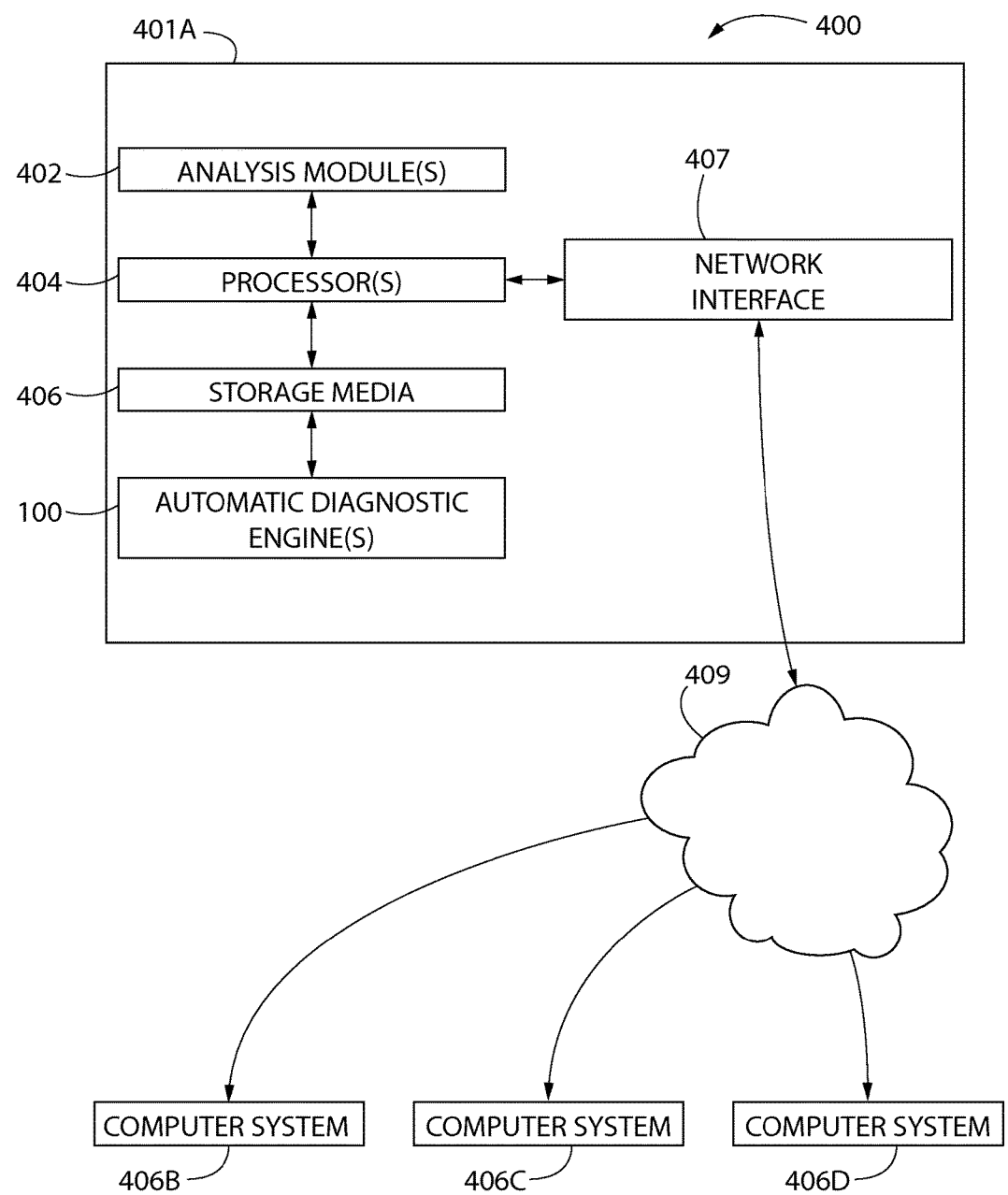
FIG. 4 illustrates a computing system for performing one or more of the methods disclosed herein, according to an embodiment.

In some embodiments, the methods of the present disclosure may be executed by a computing system. FIG. 4 illustrates an example of such a computing system 400, in accordance with some embodiments. The computing system 400 may include a computer or computer system 401A, which may be an individual computer system 401A or an arrangement of distributed computer systems. The computer system 401A includes one or more analysis modules 402 that are configured to perform various tasks according to some embodiments, such as one or more methods disclosed herein. To perform these various tasks, the analysis module 402 executes independently, or in coordination with, one or more processors 404, which is (or are) connected to one or more storage media 406. The processor(s) 404 is (or are) also connected to a network interface 407 to allow the computer system 401A to communicate over a data network 409 with one or more additional computer systems and/or computing systems, such as 401B, 401C, and/or 401D (note that computer systems 401B, 401C and/or 401D may or may not share the same architecture as computer system 401A, and may be located in different physical locations, e.g., computer systems 401A and 401B may be located in a processing facility, while in communication with one or more computer systems such as 401C and/or 401D that are located in one or more data centers, and/or located in varying countries on different continents).

A processor can include a microprocessor, microcontroller, processor module or subsystem, programmable integrated circuit, programmable gate array, or another control or computing device.

The storage media 406 can be implemented as one or more computer-readable or machine-readable storage media. Note that while in some example embodiments of FIG. 4 storage media 406 is depicted as within computer system 401A, in some embodiments, storage media 406 may be distributed within and/or across multiple internal and/or external enclosures of computing system 401A and/or additional computing systems. Storage media 406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 400 contains one or more automatic diagnostic engine(s) 100. In the example of computing system 400, computer system 401A includes the automatic diagnostic engine 100. In some embodiments, a single automatic diagnostic engine may be used to perform some or all aspects of one or more embodiments of the methods disclosed herein. In alternate embodiments, a plurality of automatic diagnostic engines may be used to perform some or all aspects of methods disclosed herein.

It should be appreciated that computing system 400 is only one example of a computing system, and that computing system 400 may have more or fewer components than shown, may combine additional components not depicted in the example embodiment of FIG. 4, and/or computing system 400 may have a different configuration or arrangement of the components depicted in FIG. 4. The various components shown in FIG. 4 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for determining whether a defect exists in a machine, comprising:
   measuring vibration of a bearing in a machine with a sensor that is coupled to the machine;
   generating a signal from the sensor that includes data related to the vibration of the bearing in the machine;
   determining whether the data in the signal is accurate or valid in response to a bias voltage of the sensor and generating a first input therefrom;
   determining whether a defect exists in the machine in response to a peak value of a frequency of the signal, a root mean square value of the signal, or both, and generating a second input therefrom;
   introducing the first input and the second input into one or more logic gates, which generate an output that indicates whether the data in the signal is accurate or valid and whether the defect exists in the machine; and
   notifying a user when the output indicates that the defect exists in the machine.

2. The method of claim 1, wherein determining whether the defect exists in the machine comprises analyzing at least a portion of the data in the signal where a defect is not known to occur for the machine.

3. The method of claim 1, wherein the data in the signal is analyzed by an automatic diagnostic engine that includes one or more failure signatures stored therein, and wherein determining whether the defect exists in the machine comprises analyzing at least a portion of the data in the signal where no failure signatures are stored in the automatic diagnostic engine.

4. The method of claim 1, wherein determining whether the data in the signal is accurate or valid comprises determining whether one or more errors have been introduced to the data by the sensor or by a cable transmitting the signal from the sensor.

5. The method of claim 1, wherein the data in the signal is analyzed using a harmonic activity locator operator, a cyclic time averaging operator, a band filter operator, or a rate of change operator.

6. The method of claim 1, further comprising determining a likelihood that the output is accurate by receiving additional signals from the sensor.

7. The method of claim 6, further comprising notifying the user when the output indicates that the defect exists in the machine and the likelihood that the output is accurate is greater than or equal to a threshold.

8. A method for determining whether a defect exists in a machine, comprising:
   measuring vibration of a bearing in a machine with a sensor that is coupled to the machine;
   generating a signal from the sensor that includes data related to the vibration of the bearing in the machine;
   introducing a bias voltage of the sensor to a first gate;
   generating a first input from the first gate in response to a bias voltage of the sensor, wherein the first input is representative of whether the data in the signal is accurate or valid;
   introducing a peak value of a frequency of the signal into a second gate;
   introducing a root man square value of the signal into the second gate;
   generating a second input from the second gate in response to the peak value and the root mean square value, wherein the second input is representative of whether a defect exists in the machine;
   introducing the first input and the second input into a third gate; and
   generating an output from the third gate that indicates whether the data in the signal is accurate or valid and whether the defect exists in the machine.

9. The method of claim 8, wherein the first gate comprises a NOT gate, the second gate comprises an OR gate, and the third gate comprises an AND gate.

10. The method of claim 8, wherein the first input is a value of 1 when the bias voltage is less than a predetermined value, indicating that the data in the signal is valid or accurate.

11. The method of claim 8, wherein the second input is a value of 1 when the peak value of the frequency of the signal is greater than a first predetermined value, or when the root mean square value of the signal is greater than a second predetermined value.

12. The method of claim 8, wherein, when the first input is a value of 1 and the second input is a value of 1, the output is a value of 1, indicating that the defect exists in the machine.

13. The method of claim 8, wherein generating the output comprises generating a plurality of outputs over time to determine whether the defect is an anomaly or a beginning of a trend.

14. A system for determining whether a defect exists in a machine, comprising:
    a sensor configured to be coupled to a machine, wherein the sensor measures vibration of a bearing in the machine and generates a signal that includes data related to the vibration of the bearing in the machine;
    a signal validation module coupled to the sensor and configured to generate a first input in response to a bias voltage of the sensor, wherein the first input is representative of whether the data in the signal is accurate or valid;
    a feature extraction module coupled to the sensor and configured to generate a second input in response to a peak value of a frequency of the signal, a root mean square value of the signal, or both, wherein the second input is representative of whether a defect exists in the machine; and
    a combinatory logic module coupled to the signal validation module and the feature extraction module and configured to receive first and second inputs and to determine whether the data in the signal is accurate or valid and whether the defect exists in the machine in response to the first and second inputs.

15. The system of claim 14, wherein the machine comprises a turbine or a compressor having a rotating shaft that is supported by the bearing.

16. The system of claim 14, further comprising an alarm level setting module coupled to the combinatory logic module and configured to transmit an alert to a user indicating that the defect exists in the machine.

17. The system of claim 16, wherein the alert is transmitted to the user when a likelihood that the defect exists is greater than a predetermined threshold.

18. The system of claim 14, wherein the feature extraction module includes one or more failure signatures stored therein, and wherein the feature extraction module is configured to determine that the defect exists in the machine even when the data in the signal does not match one of the one or more failure signatures.

* * * * *